United States Patent
Yoo

(10) Patent No.: US 12,007,767 B2
(45) Date of Patent: Jun. 11, 2024

(54) METHOD AND APPARATUS FOR AUTOMATED VALET PARKING OF VEHICLE

(71) Applicants: HYUNDAI MOTOR COMPANY, Seoul (KR); KIA MOTORS CORPORATION, Seoul (KR)

(72) Inventor: Kyung Ho Yoo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 504 days.

(21) Appl. No.: 16/679,725

(22) Filed: Nov. 11, 2019

(65) Prior Publication Data

US 2020/0150657 A1    May 14, 2020

(30) Foreign Application Priority Data

Nov. 9, 2018  (KR) .................. 10-2018-0137157

(51) Int. Cl.
*G05D 1/00* (2006.01)
*B60R 25/20* (2013.01)
(Continued)

(52) U.S. Cl.
CPC .......... *G05D 1/0088* (2013.01); *B60R 25/20* (2013.01); *B60R 25/209* (2013.01); *B60W 30/06* (2013.01);
(Continued)

(58) Field of Classification Search
CPC ......... G05D 1/0088; G05D 2201/0213; G05D 1/0212; G05D 1/0225; B60R 25/20;
(Continued)

(56) References Cited

U.S. PATENT DOCUMENTS 9,947,223 B2    4/2018  Mielenz
2010/0156672 A1    6/2010  Yoo et al.
(Continued)

FOREIGN PATENT DOCUMENTS

CN    106414201 A    2/2017
CN    107074233 A    8/2017
(Continued)

OTHER PUBLICATIONS

Loper et al.; Automated Valet Parking as Part of an Integrated Travel Assistance; Proc. of the 16th Intl. IEEE Annual Conf. on Intelligent Transportation Systems (ITSC 2013); Oct. 6-9, 2013; pp. 2341-2348 (Year: 2013).*

(Continued)

*Primary Examiner* — Michael J Zanelli
(74) *Attorney, Agent, or Firm* — MORGAN, LEWIS & BOCKIUS LLP

(57) ABSTRACT

An automated valet parking method includes receiving, by a vehicle, a vehicle return request, receiving, from an infrastructure, a guide route that guides the vehicle from a current parking position to a pickup area to the vehicle, leaving, by the vehicle, the current parking position based on the guide route, autonomously travelling, by the vehicle, to the pickup area along the guide route, and arriving, by the vehicle, at the pickup area.

15 Claims, 11 Drawing Sheets

(51) Int. Cl.
*B60W 30/06* (2006.01)
*G08G 1/14* (2006.01)

(52) U.S. Cl.
CPC ........ *G08G 1/14* (2013.01); *G05D 2201/0213* (2013.01)

(58) Field of Classification Search
CPC ..... B60R 25/209; B60W 30/06; B60W 10/06; B60W 40/02; B60W 40/10; B60W 2520/10; B60W 2556/45; B62D 15/0285; G08G 1/096725; G08G 1/14; G08G 1/096805; G08G 1/142; G08G 1/168; B60Y 2300/06
See application file for complete search history.

(56) References Cited

U.S. PATENT DOCUMENTS

| | | | |
|---|---|---|---|
| 2015/0346727 A1 | 12/2015 | Ramanujam | |
| 2015/0353080 A1 | 12/2015 | Mukaiyama | |
| 2017/0200367 A1* | 7/2017 | Mielenz | G05D 1/0212 |
| 2017/0329346 A1* | 11/2017 | Latotzki | G08G 1/143 |
| 2018/0072345 A1* | 3/2018 | Nicodemus | B62D 15/0285 |
| 2019/0163204 A1* | 5/2019 | Bai | G05D 1/0088 |
| 2019/0180618 A1* | 6/2019 | Nordbruch | G01C 21/34 |
| 2019/0244317 A1* | 8/2019 | Seki | H04W 4/021 |
| 2021/0122360 A1* | 4/2021 | Okamura | B60W 60/0025 |

FOREIGN PATENT DOCUMENTS

| | | | | |
|---|---|---|---|---|
| CN | 107531284 A | | 1/2018 | |
| DE | 10 2013 222 071 A1 | | 4/2015 | |
| DE | 10 2014 211 557 A1 | | 12/2015 | |
| DE | 102014221754 A1 | * | 4/2016 | ............ B60W 30/06 |
| DE | 102015214005 A1 | * | 1/2017 | ......... B62D 15/0285 |
| DE | 102017217720 A1 | * | 4/2019 | |
| EP | 2 957 481 A1 | | 12/2015 | |
| EP | 3284652 A1 | * | 2/2018 | ............ B60W 30/06 |
| FR | 3 039 118 A1 | | 1/2017 | |
| JP | 2018-145655 A | | 9/2018 | |
| WO | 2015/062769 A1 | | 7/2015 | |
| WO | WO-2016120119 A1 | * | 8/2016 | ............ B60W 30/06 |

OTHER PUBLICATIONS

Kyoughwan et al.; Automatic Valet Parking System Incorporating a Nomadic Device and Parking Servers; 2011 IEEE Intl. Conf. on Consumer Electronics (ICCE); pp. 111-112 (Year: 2011).*
Tcheumadjeu et al.; Integration of an Automated Valet Parking Service into an Internet of Things Platform; 2018 21st Intl. Conf. on Intelligent Transportation Systems (ITSC); Nov. 4-7, 2018; pp. 662-668 (Year: 2018).*
Extended European Search Report issued in corresponding European Patent Application No. 19207932.5 dated Apr. 3, 2020.
Communication pursuant to Article 94(3) EPC issued in corresponding European Patent Application No. 19 207 932.5 dated Dec. 16, 2021.
Office Action issued in corresponding Chinese Patent Application No. 201911087905.6 dated Jul. 4, 2022, with English translation.

* cited by examiner

FIG. 4A

| Step | Infra | Vehicle |
|---|---|---|
| <1> AVPS START | • Recognize and qualify an appropriate user (by user ID and PM) and vehicle (by unique number assigned to vehicle)<br>• Manage driving authority (receiving driving authority from the user/return the driving authority to the user)<br>• Transmit automated driving start instruction to vehicle | • Perform engine ON/OFF or power ON/OFF according to the instruction of infra<br>• Lock the vehicle according to the instruction of infra |
| <2> DETERMINATION OF TARGET POSITION AND GUIDE ROUTE | • Determine the target position, guide route, and permissive driving area, and deliver those information to vehicle | |
| <3> AUTONOMOUS DRIVING | • Instruct automated driving (start, stop, re-start) to vehicle | • Drive along the guide route designated by infra within the permitted driving area at a speed of 10km/h or less<br>• Drive within the path and width designated by infra without elevation<br>• Drive along a curve with the minimum inner radius of the vent designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicles and obstacles (TBD) and monitor safety driving and parking operation of each vehicle (supervise) | • Estimate its own position<br>• Inform the infra of its estimated position / with the accuracy and frequency specified below (TBD)<br>• Inform the infra of its own status<br>• Detect the following obstacles (TBD) |
| <5> AUTONOMOUS PARKING | | • Park and Stop the vehicle at the target position designated by infra (equivalent to PAPS parking requirements) |

FIG. 4B

| Step | Infra | Vehicle |
|---|---|---|
| <6> EMERGENCY BRAKE | • Continue to instruct automated driving to vehicle when safety is ensured as a result of safety confirmation, and to instruct the vehicle to perform an emergency stop if safety is not confirmed | • Start/emergency stop/re-start automated driving according to the instruction of infra<br>• Perform an emergency stop in case where a potential hazard is determined as a result of the detection mentioned above<br>• Immediately decelerate at the rate of (TBD) m/s² and stop, when the following conditions are met<br>  (1) vehicle received an instruction from infra for E/S<br>  (2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving from the infra after confirming that there is no obstacle ahead in the path |
| <7> AVPS END | • After the vehicle completes automated driving and parking, the infra transmits vehicle control release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g. part failure, humans or animal remaining inside the vehicle, etc.)<br>• Perform emergency stop when above fault is detected<br>• After coming to a stop, the vehicle shall remain stopped until it receives an instruction from infra to resume automated driving |

FIG. 5

| DATA | Contents | Transmit (T)/ Receive (R) | | Regularly (F)/ Event(E) Transmission | Note |
|---|---|---|---|---|---|
| | | Infrastructure | Vehicle | | |
| (1) Vehicle qualification information | ID numbers (VIN) to identify each vehicle | R | T | When entering the parking | |
| (2) Automated driving preparation instruction | - | T | R | Right before automated driving start | |
| (3) Vehicle information notification | Vehicle state (normal stop/driving/emergency stop, etc.)/Vehicle position (speed) | R | T | F (1 Hz) | This is also used for coarse correction (last check by the vehicle) |
| (4) Vehicle information in space | - | R | T | F (1 Hz) | |
| (5) Target position · guide route Delivery | Target positions · Passing points · Permitted time to pass through the point · Maximum speed | T | R | After automated driving instruction | |
| (6) Driving boundaries delivery | A group of lines to surround the permitted driving area | T | R | after automated driving preparation instruction | |
| (7) Automated driving start instruction | - | T | R | After delivery of guide route and driving boundaries, when restarting after emergency stop | |
| (8) Emergency stop instruction | - | T | R | E | |
| (9) Vehicle control release instruction | - | T | R | E | |

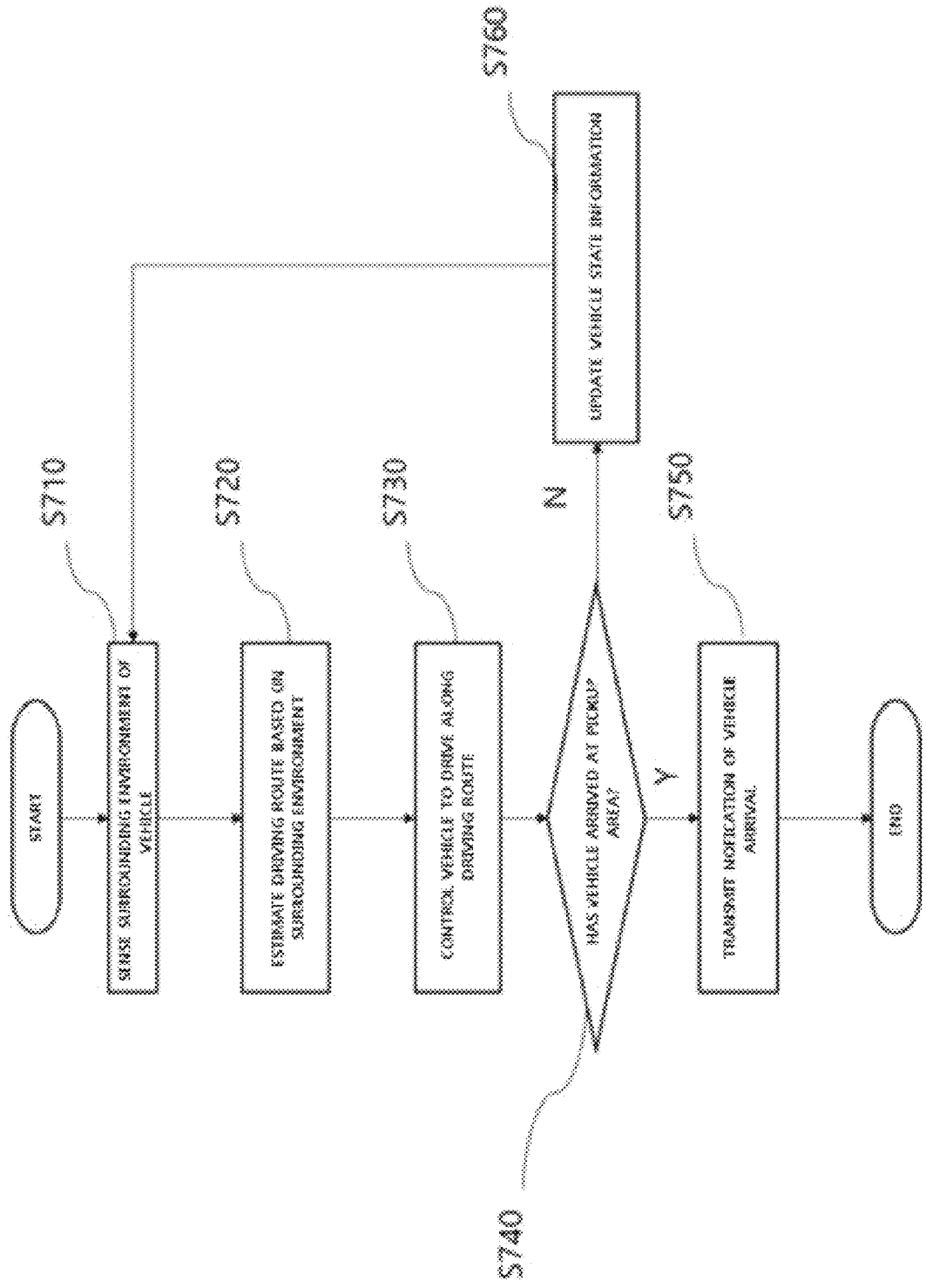

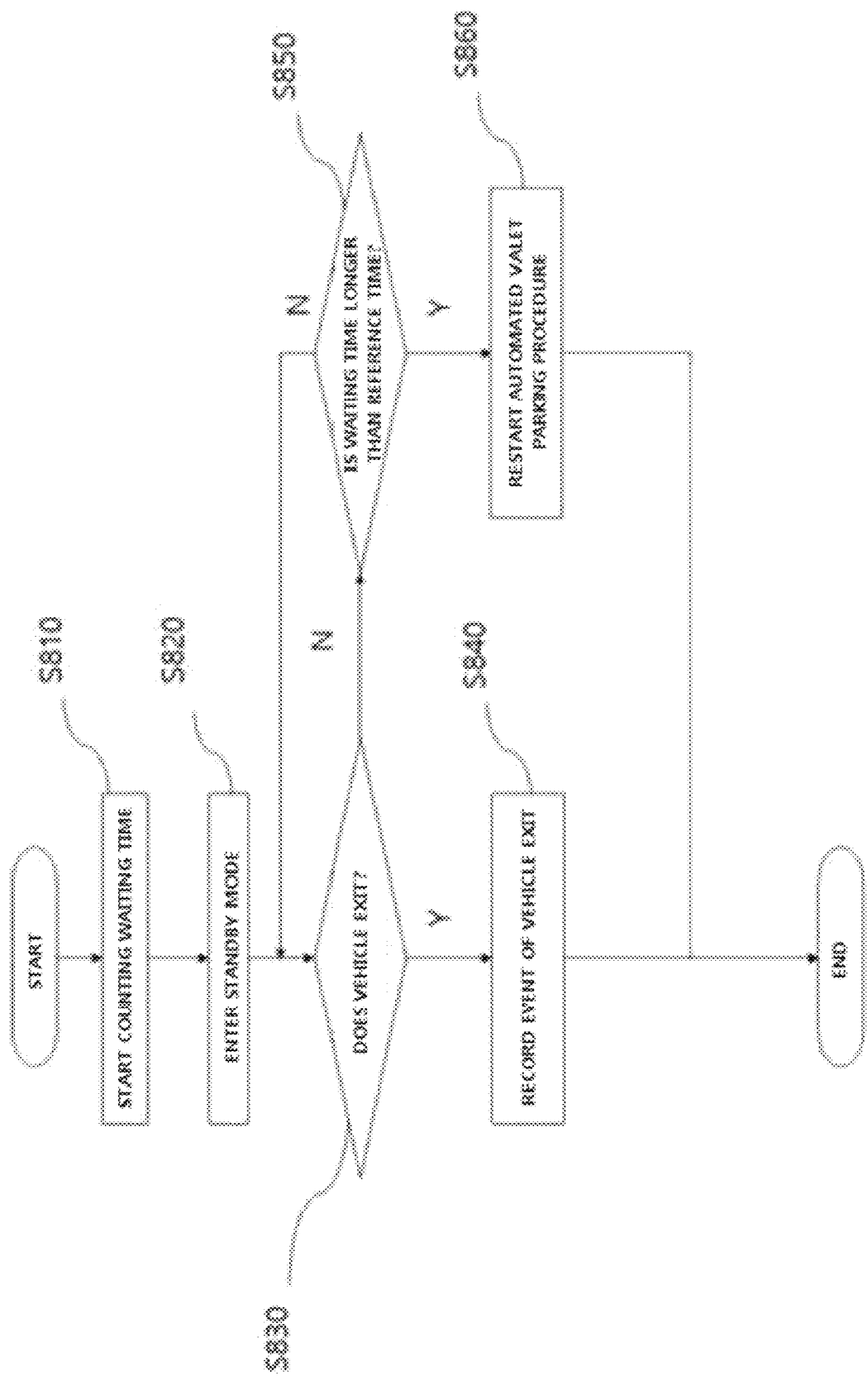

METHOD AND APPARATUS FOR AUTOMATED VALET PARKING OF VEHICLE

CROSS REFERENCE TO RELATED APPLICATION

The present application claims the benefit of priority to Korean Patent Application No. 10-2018-0137157, filed on Nov. 9, 2018 in the Korean Intellectual Property Office, the entire contents of which is incorporated herein by reference.

TECHNICAL FIELD

The present disclosure relates to a system, method, infrastructure, and vehicle for performing automated valet parking. More particularly, the present disclosure relates to an automated parking system and method in which a vehicle autonomously moves to and parks in a vacant parking slot based on communication with a parking infrastructure. The present disclosure relates to an automated parking system and method in which a vehicle autonomously moves from a parking slot to a pickup area based on communication with the parking infrastructure.

BACKGROUND

Many modern cities suffer from various problems associated with vehicle parking. For example, there is a risk of a car collision in a parking lot. For parking in crowded places such as large shopping centers, it takes long time and much energy to park a car due to traffic congestion before entering a parking lot. In addition, it takes long time and much energy to locate a vacant parking slot even after entering a parking lot. In addition, there is inconvenience that a driver must walk to a spot at which his or her vehicle is parked when leaving the visited area or that sometimes the driver forgets where the vehicle is parked.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made in view of the problems occurring in the related art and an objective of the present disclosure is to provide an automated valet parking method in which a vehicle autonomously moves to and parks in a vacant parking slot after the vehicle stops in a drop-off area at which the driver exits the vehicle.

Another objective of the present disclosure is to provide an automated valet parking method in which when a driver claims his or her vehicle to leave a visited area, the vehicle that is parked in a parking slot autonomously moves from the parking slot to a pickup area at which the driver conveniently gets in the vehicle to leave the parking lot.

According to one aspect of the present disclosure, an automated valet parking method includes receiving a vehicle return request, transmitting a guide route that guides the vehicle from a current parking position to a pickup area to the vehicle, driving the vehicle out of the current parking position according to the guide route, autonomously travelling to the pickup area along the guide route, and arriving at the pickup area.

According to another aspect of the present disclosure, an autonomous valet parking apparatus includes: a transceiver configured to receive a vehicle return request and a guide route that guides a vehicle from a current parking position to a pickup area; a processor configured to generate a control signal for preparing to exit the vehicle based on the guide route; and a vehicle controller that controls the vehicle such that the vehicle autonomously travels to the pickup area from the current parking position along the guide route according to the control signal.

The present disclosure enables driverless autonomous driving and parking, thereby preventing parking lot accidents attributable to human errors.

According to the present disclosure, empty parking spaces are managed by the intelligent parking infrastructure, which reduces time and stress in finding an empty parking space.

According to the present disclosure, a vehicle parked in a parking space without a driver moves to a predetermined pickup area, thereby eliminating an inconvenience that the driver needs to move to the parking space. In addition, the driver does not need to remember where his or her vehicle is parked.

BRIEF DESCRIPTION OF THE DRAWINGS

FIGS. 4A and 4B are diagrams illustrating operations for automated valet parking performed by an infrastructure and a vehicle according to one exemplary embodiment of the present disclosure;

FIG. 5 is a view illustrating a communication process performed by a vehicle and an infrastructure for automated valet parking, according to one exemplary embodiment of the present disclosure;

FIG. 9 is a flowchart illustrating an automated valet parking method according to one exemplary embodiment of the present disclosure; and FIG. 10 is a flowchart illustrating an automated valet parking method according to one exemplary embodiment of the present disclosure.

DETAILED DESCRIPTION

Figure 1:
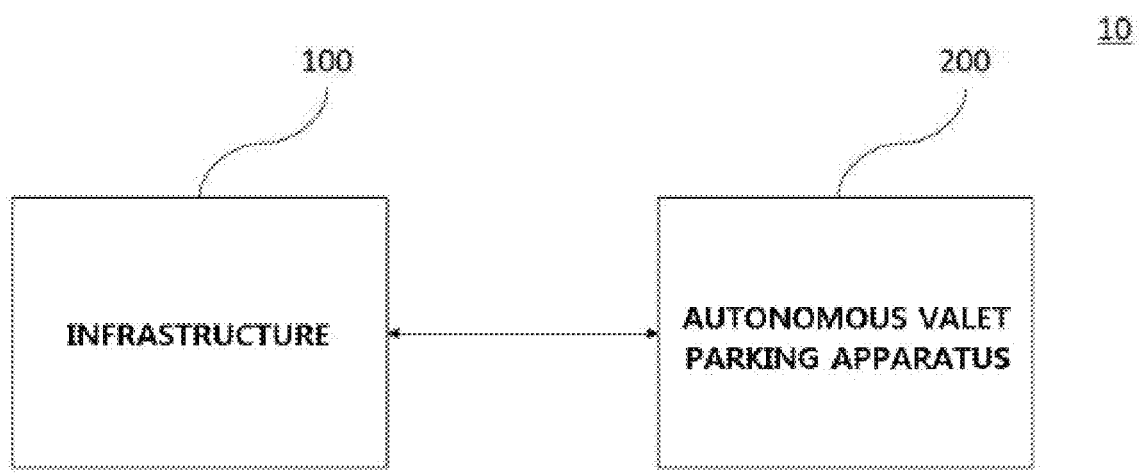
FIG. 1 is a view illustrating an automated valet parking system according to one exemplary embodiment of the present disclosure.

Herein below, exemplary embodiments of the present disclosure will be described in detail with reference to the accompanying drawings. The construction and operational effect of the present disclosure will be clearly understood from the following detailed description. Prior to describing the exemplary embodiments in detail, it is noted that throughout the drawings the same components will be denoted by the same reference numerals as possible and a detailed description about existing components and functions is omitted when the subject matter of the present disclosure may be obscured by the description.

It is also noted that terms used in the detailed description of the present disclosure are defined below.

The term "driver" refers to a person who uses an automated valet parking service based on an automated valet parking system.

The term "driving authority" refers to the authority to execute vehicle operations. The term "vehicle operation" refers to an operation such as steering, accelerating, braking, gear shifting, vehicle starting and stopping, and door locking and unlocking.

The term "vehicle" refers to a vehicle having an automated valet parking feature.

The term "control center" refers to a facility that can monitor vehicles parked in a parking garage or facility, which determines a target position, a guide route, and a permitted driving area, and which transmits a driving start instruction or an emergency stop instruction to a vehicle.

The term "infrastructure" refers to a parking facility in which sensors are installed. Alternatively, the infrastructure refers to a control center that controls a parking lot gate, vehicles in a parking lot, etc.

The term "target position" refers to a vacant parking slot available for parking. Alternatively, the term "target position" refers to a pickup area where a driver gets in his or her vehicle to leave the parking lot.

The term "guide route" refers to a route along which a vehicle travels to reach a target position. For example, at the time of parking a vehicle, the guide route is a route from a drop-off area to a vacant space. For example, the guide route is provided in the form of instructions, for example, "driving straight ahead 50 m and turning left at the corner".

The term "driving route" refers to a driving path along which a vehicle is to travel.

The term "permitted driving area" refers to an area where driving of a vehicle is allowed. For example, the permitted driving area includes the driving route. The permitted driving area is defined with barrier walls, parked vehicles, parking lines, etc.

FIG. 1 is a view illustrating an automated valet parking system according to one exemplary embodiment of the present disclosure. Referring to FIG. 1, an automated valet parking system 10 includes a parking infrastructure 100 and an autonomous valet parking apparatus 200.

The infrastructure 100 refers to a facility or system for operating, managing, and controlling an automated valet parking system. For example, the infrastructure 100 may be a parking facility. According to exemplary embodiments, the infrastructure 100 includes sensors, communication devices, alarm devices, display devices, and a server device that controls those devices. Alternatively, the infrastructure 100 refers to a control center that controls a parking lot gate, vehicles in a parking lot, etc.

The autonomous valet parking apparatus 200 means a vehicle that can perform automated valet parking. According to exemplary embodiments, the autonomous valet parking apparatus 200 means a component or a set of components that enables automated valet parking.

Figure 2:
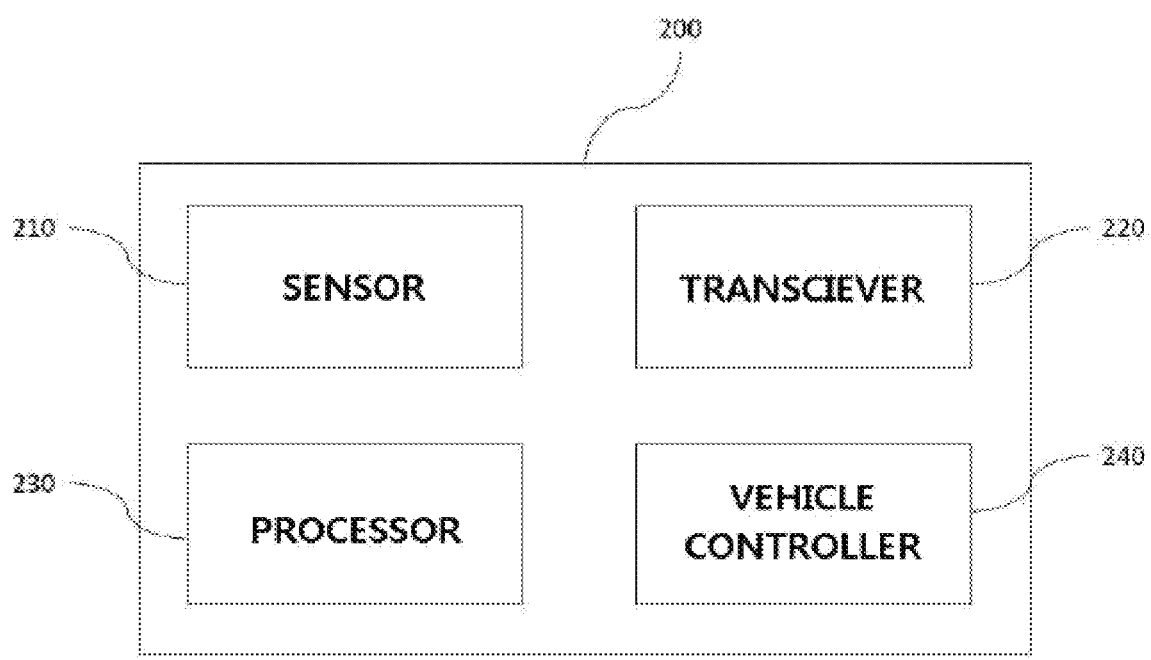
FIG. 2 is a view illustrating an autonomous valet parking apparatus according to one exemplary embodiment of the present disclosure.

FIG. 2 is a view illustrating an autonomous valet parking apparatus according to one exemplary embodiment of the present disclosure. Referring to FIG. 2, the autonomous valet parking apparatus 200 (i.e., vehicle) includes a sensor 210, a transceiver 220, a processor 230, and a vehicle controller 240.

The sensor 210 monitors the surroundings of the autonomous valet parking apparatus 200. According to exemplary embodiments, the sensor 210 measures the distance between the autonomous valet parking apparatus 200 and a specific object or detects objects that are present around the autonomous valet parking apparatus 200. For example, the sensor 210 includes at least one-type of sensor selected from among an ultrasonic sensor, a radar sensor, a lidar sensor, a camera, an infrared sensor, a thermal sensor, and a millimeter wave sensor.

The sensor 210 transmits data that is the detection results of the sensor 210 to the transceiver 220 or the vehicle controller 240.

The transceiver 220 communicates the data with the infrastructure 100. This communication is called "vehicle to infra (V2I)" communication. The transceiver 220 communicates the data with other vehicles. This communication is called "vehicle to vehicle (V2V)" communication. The V2I communication and the V2V communication are collectively called vehicle-to-everything (V2X) communication. According to exemplary embodiments, the transceiver 220 receives the data (for example, a target position, a guide route, a driving route, instructions, etc.) from the infrastructure 100, processes the received data, and transmits the processed data to the processor 230. The transceiver 220 transmits data collected and generated by the vehicle 200 to the infrastructure 100. According to exemplary embodiments, the transceiver 220 communicates the data with the mobile terminal of the driver of the vehicle 200.

The transceiver 220 receives and transmits the data according to a wireless communication protocol or a cable communication protocol. Examples of the wireless communication protocol include, not limitedly, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include, but not limited to, wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present disclosure.

The processor 230 controls the overall operation of the vehicle 200. The processor 230 controls the vehicle controller 240 based on the data transmitted from both of the sensor 210 and the transceiver 220. According to exemplary embodiments, the processor 230 generates a control signal for controlling the vehicle controller 240 based on the data transmitted from the infrastructure 100 and then transmits the control signal to the vehicle controller 240.

That is, the processor 230 refers to a device that performs a series of calculations or makes a series of determinations to control the vehicle 200 and to perform automated valet parking. For example, the processor 230 is a processor that operates according to a computer program including instructions for performing automated valet parking.

The vehicle controller 240 controls operations of the vehicle 200 according to the control signals generated by the processor 230. According to exemplary embodiments, the vehicle controller 240 controls the vehicle 200 according to the control signal transmitted from the processor 230. For example, the vehicle controller 240 controls various vehicle operations such as driving, stopping, resuming to driving, steering, accelerating, decelerating, lamp lighting, alarm sounding, etc.

That is, the vehicle controller 240 functions to control all kinds of operations of the vehicle 200 described herein.

On the other hand, although not described herein, the operations and/or functions of the vehicle 200 described in the description herein are performed by the conjunction of one or more components selected from among the sensor 210, the transceiver 220, the processor 230, and the vehicle controller 240.

Figure 3:
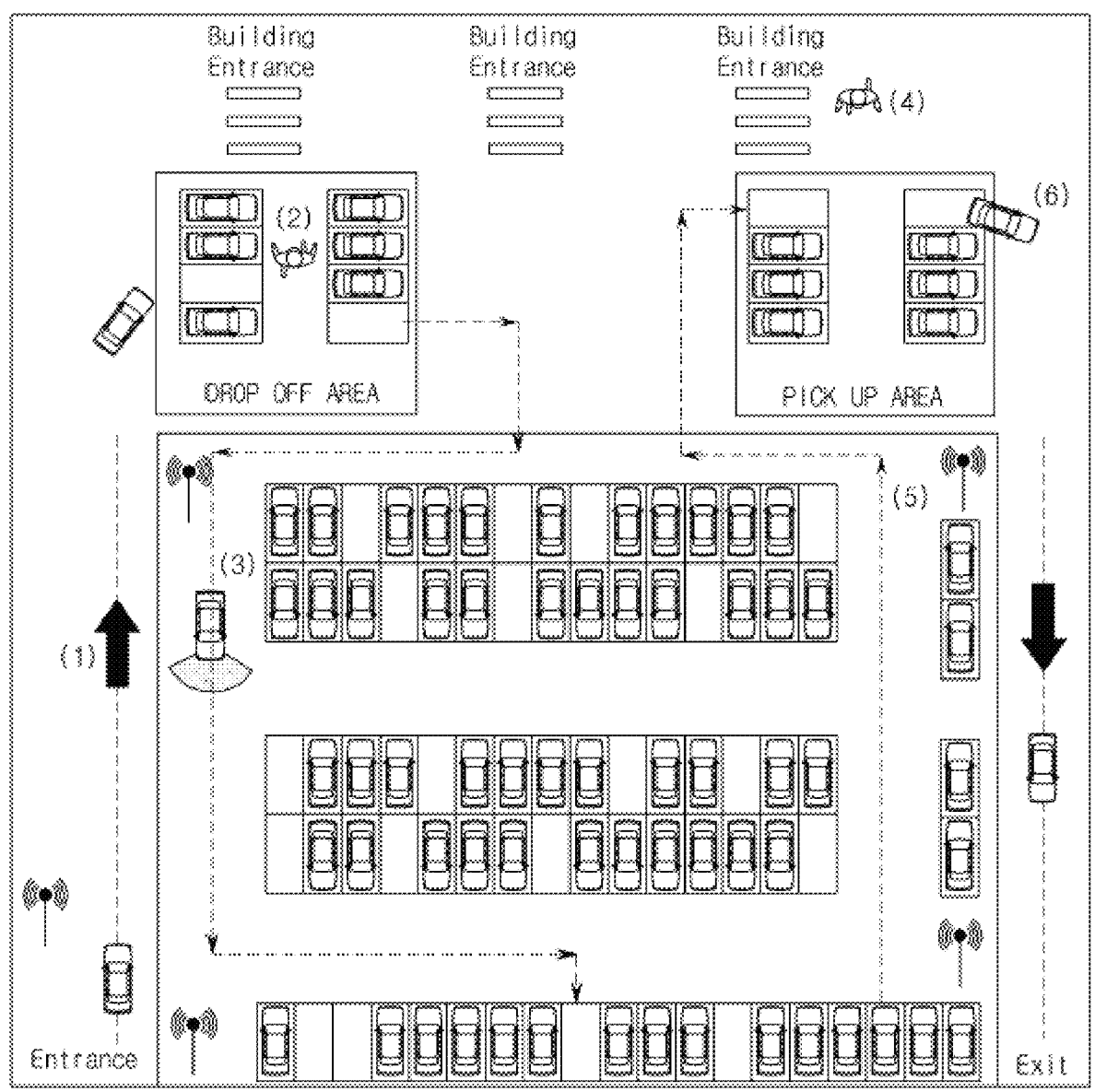
FIG. 3 is a conceptual view illustrating an automated valet parking system and method according to one exemplary embodiment of the present disclosure.

FIG. 3 is a conceptual view illustrating an automated valet parking system and an automated valet parking method according to one exemplary embodiment of the present

DISCLOSURE

Referring to FIG. 3, in step (1), a driver drives a vehicle 200 to a drop-off area at which the driver will exit the vehicle 200 after the vehicle 200 passes through the entrance of a parking lot.

In step (2), the driver exits the vehicle 200 at the drop-off area and the authority to drive or control the vehicle 200 is delegated to the infrastructure 100.

In step (3), the infrastructure 100 searches for a vacant parking slot and assigns a suitable vacant parking slot to the vehicle 200. The infrastructure 100 determines a guide route leading to the assigned vacant parking slot. After the parking slot and the guide route are determined, the vehicle 200 autonomously travels along the guide route to reach the parking slot and performs autonomous parking to the parking slot.

In step (4), the driver claims his or her vehicle parked in the parking lot and walks to a pickup area where the vehicle 200 can be returned to the driver.

In step (5), the infrastructure 100 determines a suitable target position. For example, the suitable target position may be a vacant parking slot of multiple parking slots within the pickup area. The infrastructure 100 determines a guide route which can lead the claimed vehicle 200 to the target position. After the target position and the guide route are determined and transmitted to the vehicle 200, the vehicle 200 autonomously travels along the guide route to reach the target position and performs autonomous parking.

In step (6), the driver arrives at the pickup area and takes over the authority to drive the vehicle 200. The driver drives the vehicle 200 toward the exit of the parking lot.

FIGS. 4A and 4B are diagrams illustrating operations for automated valet parking performed by an infrastructure and a vehicle.

In step (1), an automated valet parking preparation process is performed.

When a vehicle 200 enters a parking lot, an infrastructure 100 identifies a driver and the vehicle 200 and determines whether the driver and the vehicle 200 are qualified. For example, the infrastructure 100 determines whether the driver is a qualified driver by reading an identification number (ID) or a password input by the driver. In addition, the infrastructure 100 determines whether the vehicle 200 is a qualified vehicle by reading to a unique number of the vehicle. The vehicle 200 can turn on and off the engine by itself. The vehicle 200 can turn on and off a power supply by itself. For example, a state in which the engine of the vehicle 200 is turned off and the power supply is turned on is referred to as an accessary-on (ACC-On) state. The engine on/off and the power on/off of the vehicle 200 are performed according to an instruction transmitted from the infrastructure 100 or automatically performed without depending on the instruction transmitted from the infrastructure 100. The vehicle 200 can lock and unlock the door by itself. The locking/unlocking of a vehicle door is performed according to an instruction transmitted from the infrastructure 100 or is autonomously performed by the vehicle 200 without depending on the instruction from the infrastructure 100. When the vehicle 200 proceeds to an autonomous parking step, it is preferable to lock the vehicle door. In addition, the driving authority of the vehicle 200 is delegated to the infrastructure 100 from the vehicle 200. The driving authority means an authority to activate vehicle operations. The vehicle 200 operations include steering, accelerating, braking, gear shifting, ignition turning, and door locking and unlocking. Since the driving authority of the vehicle is delegated to the infrastructure 100, the infrastructure 100 can take complete control of the vehicle 200 during the automated valet parking of the vehicle 200. That is, in this case, the vehicle 200 operates according to a control signal transmitted from the infrastructure 100 while ignoring an instruction issued by the driver. Accordingly, it is possible to lower the possibility that an unintended operation of the vehicle 200 occurs and to prevent vehicle accidents in the parking lot. However, in some cases, the driving authority may be partially delegated to the infrastructure 100 from the vehicle 200 so that the vehicle 200 can still activate some of the vehicle operations, or the driving authority may be shared by the vehicle 200 and the infrastructure 100. For example, a braking operation is required when an emergency occurs during the automated valet parking. Therefore, it is preferable for the vehicle 200 to activate a breaking operation without intervention of the infrastructure 100 when the vehicle 200 senses a danger with help of an ADAS sensor. In addition, the vehicle 200 checks whether a person or animal is left in the vehicle 200. Since a parking duration from the completion of the automated valet parking to the discharging of the vehicle 200 from a parking lot is long, if a person or animal is accidently left in the vehicle while the vehicle is parked, the person or animal would be in danger. Therefore, it is important to ensure that the vehicle 200 is empty before the vehicle 200 is autonomously parked. Whether a person or animal is present in the vehicle 200 is checked with a sensor mounted on the vehicle 200. On the other hand, the driving authority is automatically returned to the driver from the infrastructure 100 when the automated valet parking is finished.

A vehicle exiting process is similar to the vehicle entering process described above. For exiting, a vehicle 200 receives a vehicle return request. The driver (i.e., owner or user of the vehicle 200) makes the vehicle return request using a device (for example, smartphone or mobile terminal) that can communicate with the infrastructure 100. When the driver makes the vehicle return request, the driver transmits vehicle information and driver information to the infrastructure 100 using a mobile terminal. The infrastructure 100 determines whether a target vehicle of the vehicle return request is parked in the parking lot based on the received vehicle information and driver information and checks whether the driver is a qualified driver. When the vehicle 200 receives the vehicle return request, the vehicle 200 or the infrastructure 100 checks whether there is a passenger in the vehicle 200 and performs the next step when no passenger is present in the vehicle 200. When the driver sends the vehicle return request, the driving authority is delegated from the driver to the vehicle 200 or the infrastructure 100. That is, when the driver sends the vehicle return request, the driver loses the right to control the vehicle 200. In this case, the vehicle 200 operates under control of its own control mechanism or the control of the infrastructure 100. For example, the vehicle doors are locked by the control of the vehicle 200 or the infrastructure 100 when the vehicle 200 leaves the parking position and unlocked when the vehicle 200 arrives at the pickup area. When the vehicle 200 arrives at the pickup area, the driving authority is returned to the driver from the vehicle 200 or the infrastructure 100.

However, in some cases, the driving authority may be partially delegated to the infrastructure 100 from the vehicle 200. In this case, the vehicle 200 still can control some operations of the vehicle 200. Alternatively, the driving authority may be shared by the vehicle 200 and the infrastructure 100. After receiving the vehicle return request, the vehicle 200 leaves the parking position upon receiving a vehicle exiting signal. Before leaving the parking position, the infrastructure 100 turns on the ignition of the vehicle 200. The infrastructure 100 transmits a notification that the vehicle 200 starts leaving the parking position to the driver.

In step (2), a process of determining a target position, a guide route, and a driving route is performed. The determination of the target position, the guide route, and the driving route is performed by the infrastructure 100. The target position, the guide route, and the driving route determined by the infrastructure 100 are delivered from the infrastructure 100 to the vehicle 200. The target position, the guide route, and the driving route determined by the infrastructure 100 are delivered to the vehicle both when the vehicle 200 enters and when the vehicle 200 exits.

In step (3), an autonomous driving process of the vehicle 200 is performed in the parking lot. The vehicle 200 autonomously travels from the drop-off area to the parking position or from the parking position to the pickup area. The autonomous driving of the vehicle 200 includes traveling, stopping, and re-traveling. The autonomous driving of the vehicle 200 is performed according to an instruction transmitted from the infrastructure 100 to the vehicle 200. Alternatively, the autonomous driving of the vehicle 200 may be performed without relying on the instruction from the infrastructure 100. The vehicle 200 can autonomously travel to the target position along the guide route within the permitted driving area. During the driverless autonomous driving of the vehicle 200, the vehicle 200 is controlled to travel at a preset speed or below. This preset speed may be a value transmitted from the infrastructure 100 to the vehicle 200 or may be a value stored in the vehicle 200. In addition, the vehicle 200 is controlled not to deviate from an error margin of the given guide route when traveling along the guide route. This preset error margin may be a value transmitted from the infrastructure 100 to the vehicle 200 or may be a value stored in the vehicle 200. In addition, the vehicle 200 may turn with a predetermined minimum turning radius when it is necessary to turn during the autonomous driving along the guide route. This preset minimum turning radius may be a value transmitted from the infrastructure 100 to the vehicle 200 or may be a value stored in the vehicle 200. The vehicle 200 is controlled not to exceed a predetermined maximum acceleration when autonomously driving along the guide route. This preset maximum acceleration may be a value transmitted from the infrastructure 100 to the vehicle 200 or may be a value stored in the vehicle 200.

In step (4), a position measurement process is performed. The target of the position measurement may be a vehicle to be parked in the parking lot, an obstacle existing in the parking lot, or a vehicle that is parked in the parking lot. The infrastructure 100 measures the position of the vehicle 200 or the obstacle and store the measured position in a database. The infrastructure 100 identifies and detects vehicles or obstacles and monitors the safety of each of the plurality of vehicles in the parking lot. In addition, the infrastructure 100 monitors the operating state of the vehicle 200 that is performing autonomous parking after reaching the target position and transmits an instruction based on the results of the monitoring. The vehicle 200 measures its position. The vehicle 200 transmits the measured position to the infrastructure 100. The error of the position measured by the vehicle 200 needs to be within a predetermined error range. The predetermined error range is determined by the infrastructure 100. The vehicle 200 detects obstacles present around the vehicle 200, measures the positions of the obstacles, and transmits the measured positions of the obstacles to the infrastructure 100. The frequency of communication between the vehicle 200 and the infrastructure 100 is predetermined.

In step (5), an autonomous parking operation is performed by the vehicle 200. The autonomous parking refers to an operation in which the vehicle 200 that has reached around the target position driverlessly enters a target vacant parking slot. The vehicle 200 performs autonomous parking by sensing nearby obstacles or vehicles that are parked by using a distance sensor mounted on the vehicle 200. Examples of the distance sensor mounted on the vehicle 200 include an ultrasonic sensor, a radar sensor, a lidar sensor, and a camera.

In step (6), an emergency braking process is performed. The emergency braking of the vehicle 200 is performed according to an instruction transmitted from the infrastructure 100 or may be performed by its own control when the vehicle 200 detects an obstacle. The infrastructure 100 instructs the vehicle 200 to apply an emergency brake when it is determined that an area around the vehicle 200 is unsafe. When the infrastructure 100 determines that the surroundings of the vehicle 200 become safe after the emergency braking is performed, the infrastructure 100 instructs the vehicle to resume autonomous driving or autonomous parking. When the vehicle 200 detects an obstacle, the vehicle 200 applies an emergency brake according to its own determination. In addition, the vehicle 200 reports to the infrastructure 100 of the emergency braking that is performed by itself or of the type or location of an obstacle which is the cause of the emergency braking. The vehicle 200 reduces its speed according to a predetermined deceleration value preset for the emergency braking. This predetermined deceleration value is a value determined by the infrastructure 100 or a value stored in the vehicle 200. The predetermined deceleration value may be determined according to the type of obstacle, the position of the obstacle, and the distance between the vehicle 200 and the obstacle. The vehicle 200 resumes autonomous driving or autonomous parking upon receiving a resumption instruction from the infrastructure 100. Alternatively, the vehicle 200 resumes the autonomous driving or autonomous parking when it confirms that the obstacle is removed. The vehicle 200 reports to the infrastructure 100 of the resumption of autonomous driving or autonomous parking and of the removal of the obstacle.

In step (7), the automated valet parking procedure is finished. After the vehicle 200 has completed autonomous driving and autonomous parking, the infrastructure 100 issues a control release instruction to the vehicle 200. The vehicle 200 can turn on and off the engine and turn on and off the power supply according to an instruction received from the infrastructure 100 or without depending on the instruction from the infrastructure 100. In addition, the vehicle 200 can lock and unlock the vehicle doors according to an instruction received from the infrastructure 100 or without depending on the instruction from the infrastructure 100. Further, the vehicle 200 can apply a parking brake according to an instruction received from the infrastructure 100 or without depending on the instruction from the infrastructure 100.

In step (8), an error control process is performed. The error control is performed when an error occurs in communication between the vehicle 200 and the infrastructure 100 and/or when a mechanical error of the vehicle 200 occurs. The infrastructure monitors communication with the vehicle 200 to detect whether a communication error occurs. The vehicle 200 detects a communication error by monitoring the communication with the infrastructure 100. The vehicle 200 determines whether a mechanical error occurs by monitoring operating states of built-in accessories including a sensor mounted thereon. The vehicle 200 detects the presence of a person or animal in the vehicle 200 and applies an emergency brake when the presence of a person or animal is detected. The vehicle 200 resumes autonomous parking or autonomous driving according to an instruction received from the infrastructure 100 when the vehicle 200 is in an emergency stop state. Alternatively, the vehicle 200 may determine, by itself, whether the cause of the emergency braking is removed and may resume autonomous parking or autonomous driving when the cause of the emergency braking is removed.

FIG. 5 is a diagram illustrating communication between an infrastructure 100 and a vehicle 200 that work in conjunction with each other to perform automated valet parking.

In step (1), vehicle qualification information is delivered from the vehicle 200 to the infrastructure 100. The vehicle qualification information includes an identifier that distinguishes each vehicle from other vehicles. For example, the vehicle qualification information may be a unique number (for example, license plate number) of the vehicle 200. The vehicle qualification information is transmitted when an automated valet parking preparation process is performed after the vehicle 200 enters a parking lot (see bracketed reference numeral (1) of FIG. 4A).

In step (2), an automated valet parking preparation instruction is transmitted from the infrastructure 100 to the vehicle 200. The automated valet parking preparation instruction is transmitted before the autonomous driving of the vehicle begins.

In step (3), vehicle information is transmitted from the vehicle 200 to the infrastructure 100. The vehicle information includes state information of the vehicle 200 and position information of the vehicle 200. The state information of the vehicle 200 includes whether the vehicle 200 is traveling, whether the vehicle 200 is stopped, or whether the vehicle 200 is in an emergency stop state. The vehicle information is transmitted periodically at a specific frequency (for example, 1 Hz which means once per second). The vehicle information is used as a parameter to determine whether a communication error has occurred between the vehicle 200 and the infrastructure 100. For example, when the vehicle information does not reach the infrastructure 100 at a predetermined time that is estimated according to the communication frequency, the infrastructure 100 determines that an error has occurred in communication between the vehicle 200 and the infrastructure 100.

In step (4), an acknowledgement of the reception of the vehicle information is transmitted from the infrastructure 100 to the vehicle. The acknowledgement of the reception of the vehicle information is transmitted at the same frequency as the transmission of the vehicle information that is transmitted in step (3). Therefore, the acknowledgement of the reception of the vehicle information is used as a parameter to determine whether an error has occurred in communication between the vehicle 200 and the infrastructure 100. For example, when the vehicle information does not reach the infrastructure 100 at a predetermined time that is estimated from the communication frequency, the infrastructure 100 determines that an error has occurred in communication between the vehicle and the infrastructure 100.

In step (5), a target position and a guide route are delivered from the infrastructure 100 to the vehicle 200. The delivery of the target position and the guide route may be performed either before or after an automated valet parking start instruction is transmitted from the infrastructure 100 to the vehicle 200.

In step (6), driving-area boundary information is transmitted to the vehicle 200 from the infrastructure 100. The driving-area boundary information includes landmarks (for examples, lines demarcating parking slots, a central line, and road boundary lines demarcating a driving lane) that mark the boundaries of a permitted driving area. The transmission of the driving-area boundary information is performed after the automated valet parking preparation instruction is delivered. This driving-area boundary information is transmitted from the infrastructure 100 to the vehicle 200 in the form of a parking lot map.

In step (7), the automated valet parking start instruction is transmitted from the infrastructure 100 to the vehicle 200. The transmission of the automated valet parking start instruction is performed after the guide route and the driving-area boundary information are delivered. Alternatively, the automated valet parking start instruction is transmitted when the cause of the emergency braking is removed.

In step (8), an emergency brake instruction is transmitted to the vehicle 200 from the infrastructure 100.

In step (9), a vehicle control release instruction is transmitted to the vehicle 200 from the infrastructure 100. The delivery of the vehicle control release instruction is performed after the vehicle 200 is autonomously parked in a parking slot.

Figure 6:
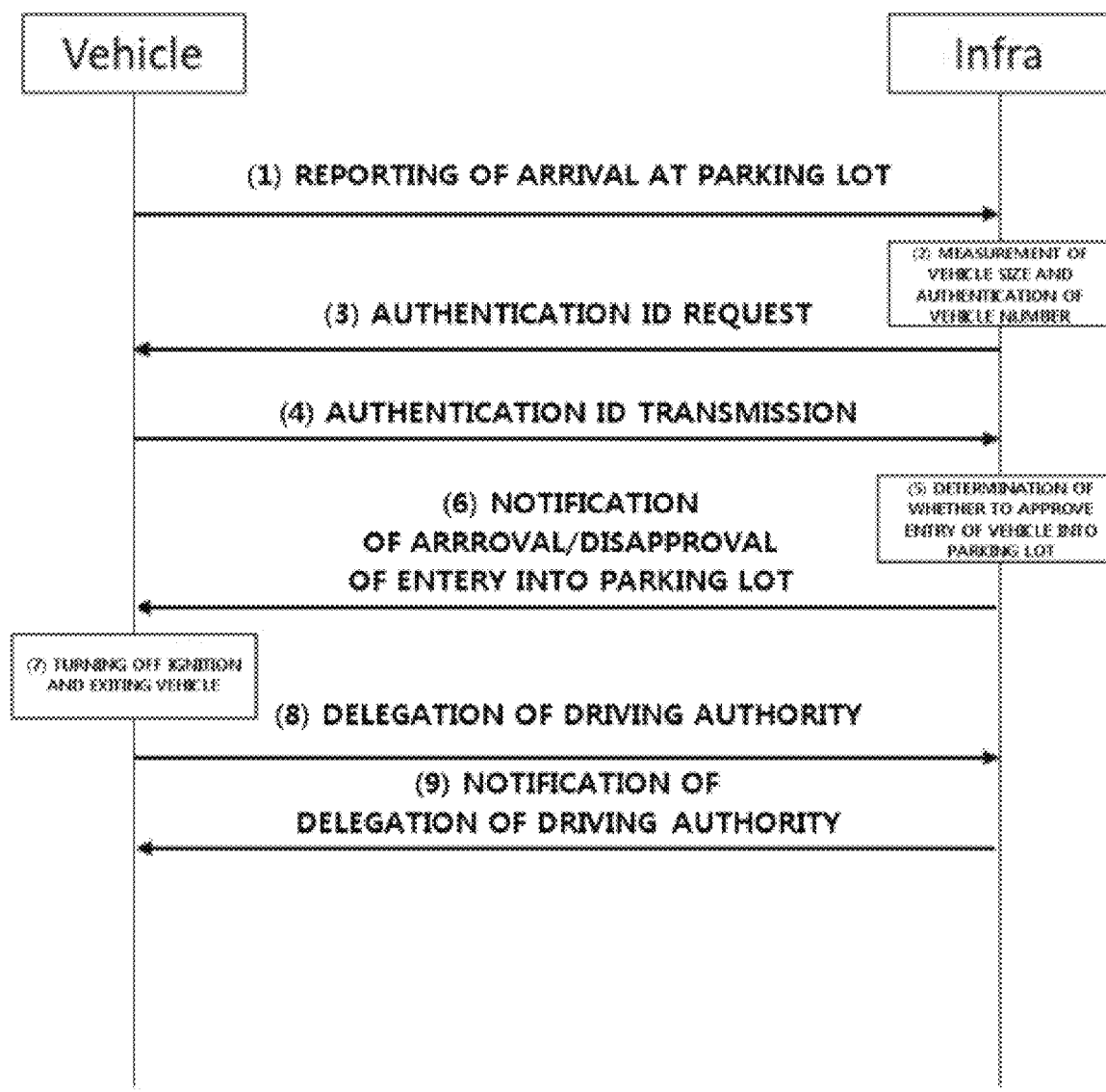
FIG. 6 is a view illustrating a communication process performed by a vehicle and an infrastructure for automated valet parking, according to one exemplary embodiment of the present disclosure.

FIG. 6 is a diagram illustrating a communication process performed between an infrastructure 100 for automated valet parking and a vehicle 200.

In step (1), the vehicle 200 enters a parking lot and stops at a predetermined stop position. This stop position may be an entrance gate of the parking lot. The vehicle 200 reports its arrival to the infrastructure 100. In step (2), the infrastructure 100 measures the dimensions of the vehicle 200 and authenticates the vehicle 200 using an authentication ID of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot based on the received authentication ID. In step (6), the infrastructure 100 notifies the vehicle whether the vehicle 200 is permitted to enter the parking lot according to the results of the authentication. For example, the infrastructure 100 displays a message indicating approval or disapproval on a display device installed around the stop position. The driver drives the vehicle 200 to a drop-off area when the entry of the vehicle into the parking lot is approved. In step (7), the driver turns off the ignition of the vehicle 200, gets off the vehicle 200, locks the vehicle doors, and leaves the drop-off area. In step (8), the authority to drive the vehicle 200 is delegated from the vehicle 200 (or the driver) to the infrastructure 100. In addition, in step (9), the infrastructure 100 notifies the driver that it takes the authority to control the vehicle 200 in the parking lot. Such a notification is sent to a driver's smart device through a mobile communication network.

Figure 7:
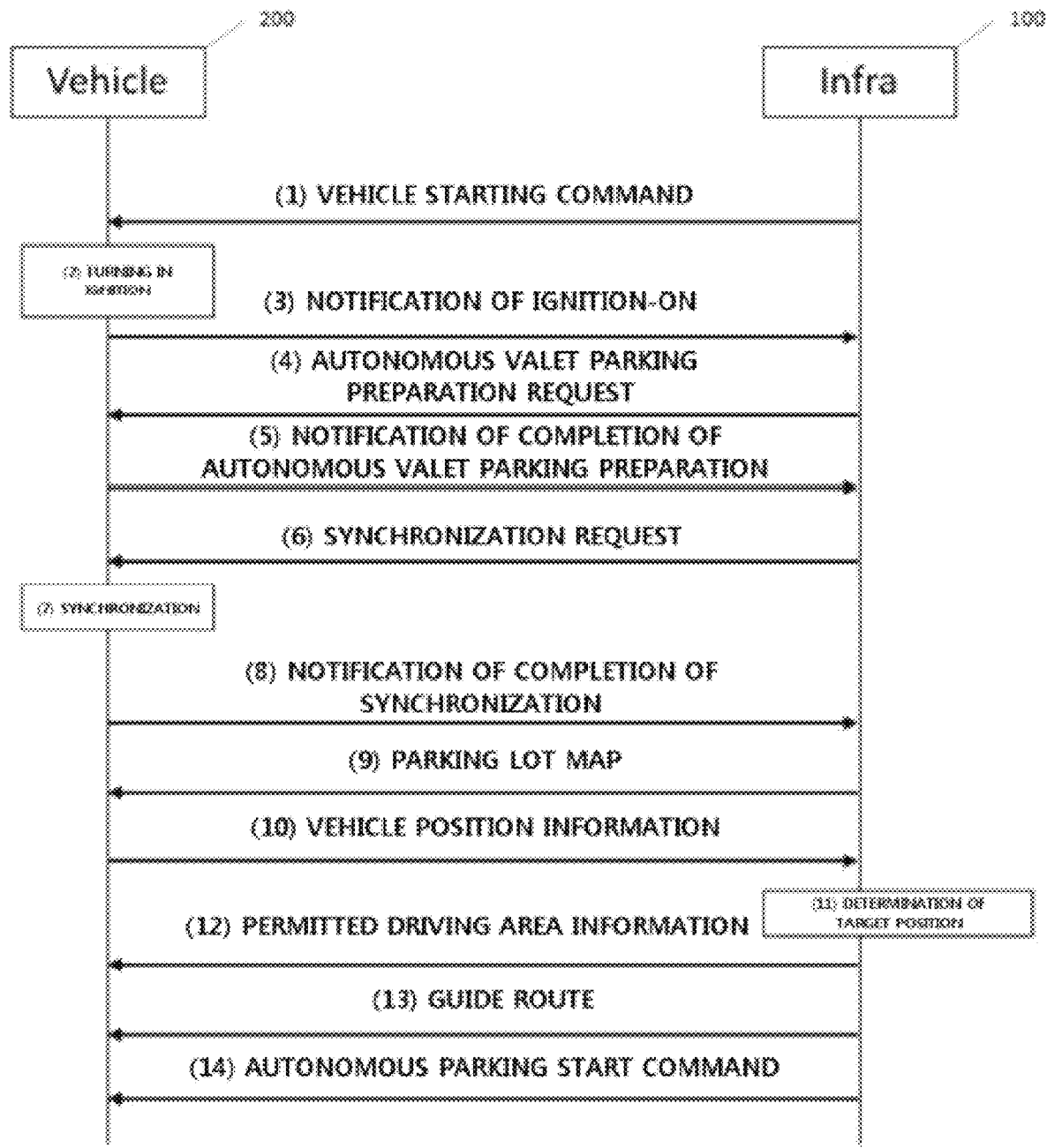
FIG. 7 is a diagram illustrating a communication process performed by a vehicle and an infrastructure for automated valet parking, according to one exemplary embodiment of the present disclosure.

FIG. 7 is a diagram illustrating communications between an infrastructure 100 for automated valet parking and a vehicle 200.

In step (1), the infrastructure 100 transmits a vehicle starting request to the vehicle 200 such that the vehicle 200 turns on the ignition. In step (2), the vehicle 200 turns on the ignition according to the vehicle starting request transmitted from the infrastructure 100. In step (3), the vehicle 200 transmits a notification that the ignition is turned on to the infrastructure. In step (4), the infrastructure 100 transmits an automated valet parking preparation request to the vehicle 200. In step (5), the vehicle 200 transmits a reply to the automated valet parking preparation request to the infrastructure 100. The reply is a message of OK indicating that the preparation for automated valet parking is completed or a message of NG indicating that the preparation for automated valet parking is not completed. In step (6), the infrastructure 100 transmits a synchronization request to vehicle 200. The synchronization request is a request for instructing synchronization of the time such that the timer of the infrastructure 100 is synchronized with the timer of the vehicle 200. For example, the synchronization request includes information about time indicated by the timer of the infrastructure 100. In step (7), the vehicle 200 performs the synchronization according to the synchronization request. In step (8), the vehicle 200 transmits a reply indicating that the synchronization is completed to the infrastructure 100. For example, until the synchronization between the infrastructure 100 and the vehicle 200 is completed, a plurality of synchronization requests may be transmitted from the infrastructure 100 to the vehicle 200. In step (9), the infrastructure 100 transmits parking lot map information to the vehicle 200. The parking lot map information includes landmark information. In step (10), the vehicle 200 estimates (or calculates) the position of the vehicle 200 based on the transmitted landmark information, and the vehicle 200 transmits the estimated position of the vehicle 200 to the infrastructure 100. In step (11), the infrastructure 100 determines a target position (target parking position). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

Figure 8:
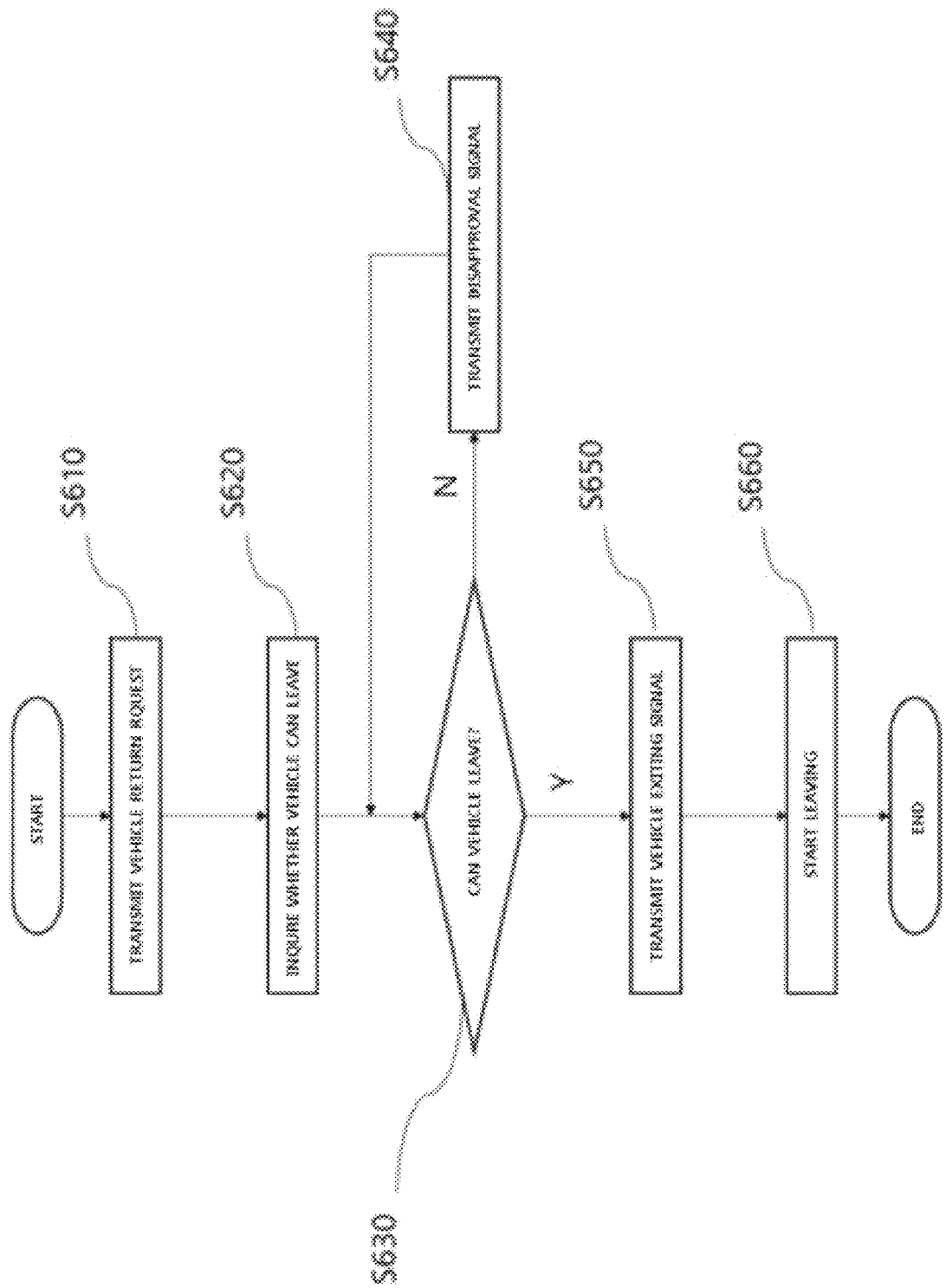
FIG. 8 is a flowchart illustrating an automated valet parking method according to one exemplary embodiment of the present disclosure.

FIG. 8 is a flowchart illustrating an automated valet parking method according to one exemplary embodiment of the present disclosure. A series of steps included in the automated valet parking method according to the present disclosure is performed under control of the infrastructure 100 or under control of the own control mechanism of the vehicle. It is noted that subjects that perform the steps described below are illustrative.

The driver makes a vehicle return request using a terminal device that can communicate with the infrastructure 100 so that the vehicle 200 is returned in step S610. According to exemplary embodiments, the driver makes the vehicle return request using his or her own terminal device or a device installed in the parking lot. The vehicle return request is transmitted to the vehicle 200.

For example, the device installed in the parking lot monitors a specific area of the parking lot to check whether the driver enters the specific area. When the driver enters the specific area, the device recognizes personnel information (for example, mobile number or iris information) of the driver and automatically transmits the vehicle return request to the corresponding vehicle.

The vehicle 200 that has received the vehicle return request transmits a confirmation inquiry to check whether it is the time to leave the parking position in step S620. According to exemplary embodiments, the vehicle 200 transmits a confirmation inquiry to the infrastructure 100 after receiving the vehicle return request to determine the time at which the vehicle can leave the parking position to move toward the pickup area (exit area). That is, before leaving the parking position, the vehicle 200 makes an inquiry to the infrastructure 100 to confirm that the vehicle can leave the parking position to move toward the pickup area. A parking lot generally accommodates many vehicles but a pickup area in the parking lot accommodates a relatively small number of vehicles. Therefore, when many vehicles return requests are concentrated in a specific time zone, the traffic in the pickup area needs to be controlled to avoid traffic congestion and accidents. According to the exemplary embodiments, since the vehicle performs a process of checking whether it is the time to leave the parking position, traffic congestion and accidents in the pickup area can be avoided.

The infrastructure 100 determines whether the vehicle can leave the parking position at the time of receiving the confirmation inquiry in step S630. According to exemplary embodiments, the infrastructure 100 determines whether the vehicle can leave the parking position to move toward the pickup area based on information on the pickup area. For example, the infrastructure 100 determines whether to allow a specific vehicle to leave a parking position based on at least one type of information selected from among the number of vehicles existing in the pickup area, the number of vehicles moving toward the pickup area according to the vehicle return requests, the number of drivers waiting for his or her vehicle in the pickup area, and the number of vehicles that have received the respective vehicle return requests prior to the specific vehicle 200.

For example, when the number of vehicles existing in the pickup area is equal to or greater than the accommodation capacity of the pickup area, the infrastructure 100 determines that the vehicle 200 cannot leave but must wait. On the contrary, when the number is less than the accommodation capacity of the pickup area, the infrastructure 100 determines that the vehicle 200 can leave the parking position.

For example, when the sum of the number of vehicles existing in the pickup area and the number of vehicles moving toward the pickup area is equal to or greater than than the accommodation capacity of the pickup area, the infrastructure 100 determines that the vehicle 200 cannot leave but must wait. On the contrary, when the number is less than the accommodation capacity of the pickup area, the infrastructure 100 determines that the vehicle 200 can leave the parking position.

For example, when the sum of the number of vehicles existing in the pickup area and the number of vehicles that have received the respective vehicle return requests prior to the vehicle 200 is equal to or greater than the accommodation capacity of the pickup area, the infrastructure 100 determines that the vehicle 200 cannot leave but must wait. On the contrary, when the number is less than the accommodation capacity of the pickup area, the infrastructure 100 determines that the vehicle 200 can leave the parking position.

The infrastructure 100 determines whether the vehicle 200 can leave the parking position without receiving the confirmation inquiry from the vehicle 200. That is, the step S620 is optional. The infrastructure 100 determines whether the vehicle 200 can leave the parking position regardless of the confirmation inquiry from the vehicle 200 in a case where the vehicle return request is delivered to the vehicle 200 via the infrastructure 100 or a case where the terminal device of the driver and the infrastructure 100 are interlinked.

When the determination result is negative (N in step S630), that is, when it is determined that the vehicle 200 cannot leave but must wait in the parking position, the infrastructure 100 transmits a notification of disapproval to the vehicle 200 in step S640. According to exemplary embodiments, the infrastructure 100 provides the reason of the disapproval after transmitting the notification of disapproval to the vehicle 200. In addition, the infrastructure 100 may transmit an estimated waiting time to the vehicle 200. In addition, the infrastructure 100 transmits to the driver a message of asking whether to cancel the vehicle return request or to be in the queue.

According to exemplary embodiments, the infrastructure 100 periodically determines whether the vehicle can leave the parking position to move toward the pickup area for each of the vehicles in the queue after transmitting the notification of disapproval.

When the determination result is positive (Y in step S630), that is, when it is determined that the vehicle 200 can leave the parking position, the infrastructure 100 transmits a notification of approval to the vehicle 200 in step S650. According to exemplary embodiments, the infrastructure 100 transmits information (referred to as exit processing information that is necessary for the vehicle to exit the parking lot) to the vehicle 200. The exit processing information includes at least one type of information selected from among the parking position of the vehicle 200, the pick-up position of the vehicle, the guide route from the current vehicle position to the pickup area, the permitted driving area, and information on obstacles present on the guide route.

The vehicle 200 receives the exit processing information from the infrastructure 100 and starts an exiting process based on the received information. According to exemplary embodiments, the vehicle 200 determines a driving path leading to the pickup area based on the exit processing information and sensing information obtained by the built-in sensors and autonomously travels along the driving path. The driving path determined by the vehicle 200 may be the same as the guide route transmitted from the infrastructure 100. However, the driving path may be different from the guide route. The driving path means a path along which the vehicle 200 is to actually travel.

For example, the vehicle 200 determines whether traveling along the guide route provided by the infrastructure 100 is possible based on sensing information obtained by the built-in sensors. When it is determined to be impossible, the vehicle 200 finds an alternative driving path based on the sensing information obtained by the built-in sensors and travels along the alternative driving path. The driving path may be a path close to the guide route. That is, the driving path may be different from the guide route but may share at least one node with the guide route.

For example, the vehicle 200 detects a first node that is blocked on the guide route transmitted from the infrastructure 100, detects a second node that is not block and is close the first node, replaces the first node with the second node, thereby creating a new driving path.

According to exemplary embodiments, the vehicle 200 prepares for leaving the parking position after receiving a vehicle exiting signal. The preparation for leaving the parking position includes a process of turning on the ignition and a system checking process.

According to exemplary embodiments, the vehicle 200 calculates an exit time duration that takes for the vehicle 200 to reach the pickup area from the current position. Then, the vehicle 200 transmits the exit time duration and information on the pickup area to the terminal device of the driver.

FIG. 9 is a flowchart illustrating an automated valet parking method according to one exemplary embodiment of the present disclosure. Referring to FIG. 9, the vehicle 200 monitors its surroundings while traveling toward the pickup area after receiving the vehicle exiting signal and generates surrounding environment information in step S710. According to exemplary embodiments, the vehicle 200 detects obstacles (stationary or moving objects) and landmarks that are present around the vehicle 200 with the use of the built-in sensors.

The vehicle 200 performs calculations to find a driving path leading to the pickup area based on the surrounding environment information in step S720. According to exemplary embodiments, the vehicle 200 determines a driving path leading to the pickup area based on the exit processing information provided by the infrastructure 100 and the surrounding environment information.

The vehicle 200 self-controls its operation during traveling to the pickup area along the driving path in step S730. According to exemplary embodiments, the vehicle 200 controls the lateral driving and the longitudinal driving of the vehicle 200 based on the driving path in step S730.

The vehicle 200 can reach the pickup area by traveling along the driving path. According to exemplary embodiments, when the vehicle 200 arrives at the pickup area, the vehicle 200 autonomously parks in the pickup area to wait for the driver getting in.

In step S740, it is determined whether the vehicle 200 has arrived at the pickup area. According to exemplary embodiments, the vehicle 200 determines whether it has reached the pickup area by comparing the coordinates of the current vehicle position and the coordinates of the pickup area. Alternatively, the vehicle 200 may determine whether it has reached the pickup area by detecting sensors or indicators installed in the parking lot. According to exemplary embodiments, the infrastructure 100 determines whether the vehicle 200 has reached the pickup area using sensors (which are included in the infrastructure) installed around the pickup area. In this case, the infrastructure 100 transmits the result of the determination of whether the vehicle 200 has reached the pickup area to the vehicle 200.

When the vehicle 200 has reached the pickup area (Y in S740), the vehicle 200 notifies the driver (i.e., terminal device of the driver) or the infrastructure 100 of its arrival at the pickup area in step S750.

When the vehicle 200 has reached the pickup area (Y in S740), the vehicle 200 stops by applying the brake or by shifting the gear.

According to exemplary embodiments, when the vehicle 200 has reached the pickup area (Y in S740) in response to the vehicle return request, the driving authority is delegated from the vehicle 200 or the infrastructure 100 to the driver.

When the vehicle 200 has not reached the pickup area (N in S740), the vehicle 200 updates state information on the vehicle 200 and transmits the state information of the vehicle 200 to the driver (i.e., the terminal device of the driver) or the infrastructure 100 in step S760. The state information of the vehicle 200 includes at least one of a current position of the vehicle 200, a current vehicle speed, and an estimated arrival time. According to exemplary embodiments, the vehicle 200 performs the process denoted by S710 after the state information of the vehicle 200 is transmitted.

FIG. 10 is a flowchart illustrating an automated valet parking method according to one exemplary embodiment of the present disclosure. Referring to FIG. 10, the vehicle 200 that has reached the pickup area performs a time counting operation in step S810. That is, the vehicle 200 counts the time to measure its waiting time duration after reaching the pickup area.

The vehicle 200 enters a standby mode in step S820. The standby mode means an operation mode in which the vehicle operates while minimizing the power consumption. The vehicle 200 may enter the standby mode as soon as it reaches the pickup area.

In step S830, it is determined whether the vehicle 200 has exited the parking lot. According to exemplary embodiments, the infrastructure 100 determines whether the vehicle exits the parking lot using the sensors provided in the infrastructure 100. According to exemplary embodiments, the infrastructure 100 determines whether the vehicle 200 exits the parking lot based on information obtained by sensors installed at a parking lot exit.

When the vehicle 200 exits the parking lot (Y in S830), the infrastructure 100 records an event that the vehicle 200 exits the parking lot in a database and updates the management information of the infrastructure 100. When the infrastructure 100 stores the record of the event that vehicle exits the parking lot. For example, the infrastructure 100 removes the vehicle 200 that has exited the parking lot from a list of vehicles parked in the parking lot. The infrastructure 100 records the number (license plate number) of the vehicle 200 in a database when the vehicle 200 passes through the entrance of the parking lot and deletes the number of the vehicle 200 when the vehicle 200 passes through the exit of the parking lot. In this way, the infrastructure 100 manages the list of vehicles existing in the parking lot.

In a case where the vehicle 200 stays in the parking lot (N in S830), the vehicle 200 compares the counted waiting time duration with a reference time duration and determines whether the waiting time duration exceeds the reference time duration in step S850. The waiting time duration is stored in a memory.

When the waiting time duration does not exceed the reference time duration (N in S850), the vehicle 200 maintains the standby mode.

When the waiting time duration exceeds the reference time duration (Y in S850), the vehicle 200 stops the exiting procedure and restarts the automated valet parking procedure in step S860. That is, when the waiting time duration of the vehicle in the pickup area exceeds the reference time duration, it is determined that the driver has no intention to get in the vehicle 200 to leave the parking lot. Thus, the automated valet parking procedure begins. When the driver does not get in the vehicle 200 even though the vehicle arrives at the pickup area in response to the vehicle return request, the space of the pickup area is likely to be crowded. According to exemplary embodiments, in a case where the driver does not get in the vehicle 200 until a predetermined time passes after the vehicle reaches the pickup area, the vehicle 200 that is waiting for driver's seating needs to undergo the parking procedure. Therefore, it is possible to prevent the pickup area (exit area) from being congested.

According to exemplary embodiments, when the waiting time duration exceeds the reference time duration (Y in S850), the vehicle 200 stops the exiting procedure and transmits a parking request to the infrastructure 100. The infrastructure 100 finds a new parking slot among the parking slots in the parking lot according to the parking request and assigns a suitable vacant parking slot to the vehicle 200. The infrastructure 100 determines a guide route leading to the assigned vacant parking slot. After the parking slot and the guide route are determined, the vehicle autonomously travels along the guide route to reach the new parking slot and performs autonomous parking to the parking slot. In this case, the infrastructure 100 notifies the driver of the vehicle 200 that the vehicle 200 is parked.

In one or more exemplary embodiments, the described functions may be implemented in the form of hardware, software, firmware, or any combination thereof. When implemented in the form of software, these functions may be stored on or transmitted to a computer-readable medium in the form of one or more instructions or codes. The computer-readable medium refers to any medium that can transfer a computer program from one computer to another. For example, it may be a communication medium or a computer-readable storage medium. The storage medium may be an arbitrary medium that can be accessed by a computer. The computer-readable media include, not limitedly, RAMS, ROMs, EEPROMs, optical discs such as CD-ROM, magnetic disks, and any media that can be accessed by computers and which can be used to transfer a computer program in the form of instructions from one place to another. The computer-readable media is appropriately referred to as media that can be arbitrarily accessed by computers. For example, software can be transferred from a website, server or other remote sources through a cable or over a wireless channel. Examples of the cables include coaxial cable, fiber optic cable, twisted pair cable, and digital subscriber line (DSL). Examples of the wireless channel include infrared frequency waves, radio frequency waves, and ultrahigh frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a Blu-ray disc. Discs generally refer to media from which data is optically read and disks refer to media from which data is magnetically read. Combinations of the above-mentioned media also fall within the definition of the computer-readable medium.

When embodiments are implemented as program code or code segments, the code segment may be a procedure, function, subprogram, program, routine, subroutine, module, software package, class, instructions, data structures, program command strings, or an arbitrary set of program command strings. One code segment may be connected with another code segment or a hardware circuit in a manner of transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more exemplary embodiments. Of course, the above-described embodiments do not cover all possible combinations of components and/or methods to implement the present disclosure. Thus, those skilled in the art will appreciate that many further combinations and substitutions of components and/or methods in various embodiments are possible. Accordingly, the above-described embodiments cover all such alterations, modifications, and variations that fall within the spirit and scope of the appended claims. Moreover, as to the scope of the terms "comprises" used in the detailed description or the appended claims, it is noted that it is similarly interpreted as "comprising" that is used as a transitional word in the claims.

As used herein, the term "infer" or "inferencing" generally refers to a process of determining or inferring a state of a system, environment, and/or user from a set of observations of events and/or data. Inferencing can be used to identify a specific situation or action, or can generate a probability distribution of certain states, for example. Inferencing is probabilistic. That is, inferencing may mean a calculation of a probability distribution of those states, based on study on data and events. Inferencing may involve techniques used to construct a higher level event from a set of events and/or data. The inferencing refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, but not limitedly, hardware, firmware, any combination of hardware and software, software, or a computer entity associated with software being executed therein. For example, the term "component" may refer to, not limitedly, a process running on a processor, a processor, an object, an executable thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems based on a signal that is transmitted over a network such as Internet) with a local and/or remote process.

What is claimed is:

1. An automated valet parking method comprising:
   receiving, by a vehicle that is parked, a vehicle return request;
   receiving, by the vehicle, a guide route from a current parking position to a pickup area from an infrastructure;
   preparing, by the vehicle, to leave the current parking position based on the guide route; and
   performing autonomous driving, by the vehicle, from the current parking position to the pickup area along the guide route;
   arriving, by the vehicle, at the pickup area;
   receiving, by the vehicle, a vehicle control release instruction instructing engine off or power off from the infrastructure after the vehicle arrives at the pickup area; and
   performing, by the vehicle, engine off or power off according to the vehicle control release instruction.

2. The method according to claim 1, wherein the preparing to leave the current parking position comprises:
   receiving, by the vehicle, a vehicle exiting signal from the infrastructure; and
   performing, by the vehicle, a vehicle starting operation when receiving the vehicle exiting signal.

3. The method according to claim 2, further comprising:
   delegating a driving authority to the vehicle or the infrastructure from a driver of the vehicle when the vehicle receives the vehicle return request; and
   delegating the driving authority from the vehicle or the infrastructure to the driver of the vehicle when the vehicle arrives at the pickup area.

4. The method according to claim 3, further comprising:
   automatically locking doors of the vehicle under control of the vehicle or the infrastructure when the vehicle leaves the current parking position; and
   automatically unlocking the doors of the vehicle under control of the vehicle or the infrastructure when the vehicle arrives at the pickup area.

5. The method according to claim 1, further comprising:
   receiving, by the vehicle, a vehicle exiting signal when it is determined that the vehicle is allowed to leave the current parking position based on at least one of information of the current parking position or information of the pickup area.

6. The method according to claim 5, wherein the information of the pickup area includes at least one type of information selected from among the number of vehicles existing in the pickup area, the number of vehicles moving toward the pickup area, the number of vehicles that have previously received respective vehicle return requests, and the number of drivers waiting in the pickup area.

7. The method according to claim 1, wherein the performing autonomous driving comprises:
monitoring, by the vehicle, a surrounding environment of the vehicle using built-in sensors and generating surrounding environment information;
determining, by the vehicle, a driving path based on the guide route and the surrounding environment information; and
autonomously driving, by the vehicle, to the pickup area along the driving path.

8. The method according to claim 7, wherein the determining a driving path comprises:
determining, by the vehicle, whether the surrounding environment is in a condition in which the vehicle can autonomously drive along the guide route, based on the surrounding environment information; and
determining a driving path that is different from the guide route but shares at least one node with the guide route when the surrounding environment is in a condition in which the vehicle cannot autonomously drive along the guide route.

9. The method according to claim 1, further comprising:
determining, by the vehicle, whether the vehicle has reached the pickup area; and
transmitting, by the vehicle, to the infrastructure at least one piece of information selected from among a current vehicle position, a current vehicle speed, and an expected arrival time, when it is determined that the vehicle is not in the pickup area.

10. The method according to claim 1, further comprising:
entering a standby mode, by the vehicle, after arriving at the pickup area and counting a waiting time duration;
comparing, by the vehicle, the counted waiting time duration with a reference time duration; and
initiating, by the infrastructure, an automated valet parking procedure for the vehicle when the waiting time duration exceeds the reference time duration.

11. The method according to claim 10, wherein the initiating an automated valet parking procedure comprises:
transmitting, by the vehicle, a parking request to the infrastructure;
receiving, by the vehicle, a new parking position for the vehicle and a guide route to the new parking position;
performing, by the vehicle, autonomous driving to the new parking position along the guide route; and
performing, by the vehicle, autonomous parking to the new parking position.

12. A non-transitory computer-readable medium storing a program comprising instructions for performing, when executed by a processor, the method according to claim 1.

13. An autonomous valet parking apparatus for performing automated valet parking, the apparatus comprises:
a transceiver configured to receive a vehicle return request and a guide route that guides a vehicle from a current parking position to a pickup area;
a processor configured to generate a control signal for preparing to exit the vehicle based on the guide route; and
a vehicle controller configured to control the vehicle such that the vehicle autonomously travels to the pickup area from the current parking position along the guide route according to the control signal,
wherein the transceiver is further configured to receive a vehicle control release instruction instructing engine off or power off from the infrastructure after the vehicle arrives at the pickup area, and
wherein the vehicle controller controls to perform engine off or power off according to the vehicle control release instruction.

14. The apparatus according to claim 13, wherein when the transceiver receives a vehicle exiting signal, the processor generates a control signal that activates a vehicle starting operation in response to the vehicle exiting signal.

15. The apparatus according to claim 13, wherein a driving authority is delegated to the vehicle or the infrastructure from a driver of the vehicle when the vehicle receives the vehicle return request, and
wherein the driving authority is delegated from the vehicle or the infrastructure to the driver of the vehicle when the vehicle arrives at the pickup area.

* * * * *